United States Patent
Young

(10) Patent No.: US 7,032,415 B2
(45) Date of Patent: *Apr. 25, 2006

(54) LUGGAGE STRAP WITH RATCHET AND LOCK

(75) Inventor: Wei Young, Long Island City, NY (US)

(73) Assignee: Zelco Industries, Inc., Mount Vernon, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,972

(22) Filed: Feb. 2, 2004

(65) Prior Publication Data

US 2004/0154357 A1    Aug. 12, 2004

Related U.S. Application Data

(63) Continuation of application No. 09/927,722, filed on Aug. 10, 2001, now Pat. No. 6,684,667.

(51) Int. Cl.
*E05B 65/52* (2006.01)
*E05B 73/00* (2006.01)

(52) U.S. Cl. .............. 70/18; 70/58; 70/69; 70/312; 70/DIG. 9

(58) Field of Classification Search ............ 70/18, 70/58, 69, DIG. 9, 312; 24/DIG. 48
See application file for complete search history.

(56) References Cited

U.S. PATENT DOCUMENTS

| 3,592,028 | A | * | 7/1971 | La Monica | 70/57 |
| 3,875,771 | A | * | 4/1975 | Reisner | 70/18 |
| 4,547,980 | A | * | 10/1985 | Olivieri | 36/50.5 |
| 5,606,779 | A | * | 3/1997 | Lu | 24/68 SK |
| 5,692,403 | A | * | 12/1997 | Ling | 70/312 |
| 5,745,963 | A | * | 5/1998 | Graziano | 24/68 SK |
| 5,839,170 | A | * | 11/1998 | Cho | 24/163 R |
| 5,899,102 | A | * | 5/1999 | Ling | 70/312 |
| 6,016,675 | A | * | 1/2000 | Te | 70/312 |
| 6,044,669 | A | * | 4/2000 | Levi | 70/18 |
| 6,189,348 | B1 | * | 2/2001 | Huang | 70/18 |
| 6,397,644 | B1 | * | 6/2002 | Gidding | 70/18 |
| 6,684,667 | B1 | * | 2/2004 | Young | 70/18 |

FOREIGN PATENT DOCUMENTS

| DE | 492599 | * | 3/1930 | | 70/69 |
| DE | 2725843 | * | 12/1977 | | 70/18 |
| WO | WO82/03242 | * | 9/1982 | | 70/69 |

* cited by examiner

Primary Examiner—Lloyd A. Gall
(74) Attorney, Agent, or Firm—Donald S. Dowden; Cooper & Dunham LLP

(57) ABSTRACT

First and second separable portions such as opposite ends of a strap that is wrapped around one or more articles to be secured are overlapped. A ratchet is operable with the portions joined in overlapping relation for increasing the amount of the overlap, thereby effectively shortening the strap and taking up slack. A mechanical advantage is provided that makes it easy to tighten the strap securely around one or more articles. A lock can be locked to prevent, or unlocked to enable, separation of the portions.

2 Claims, 6 Drawing Sheets

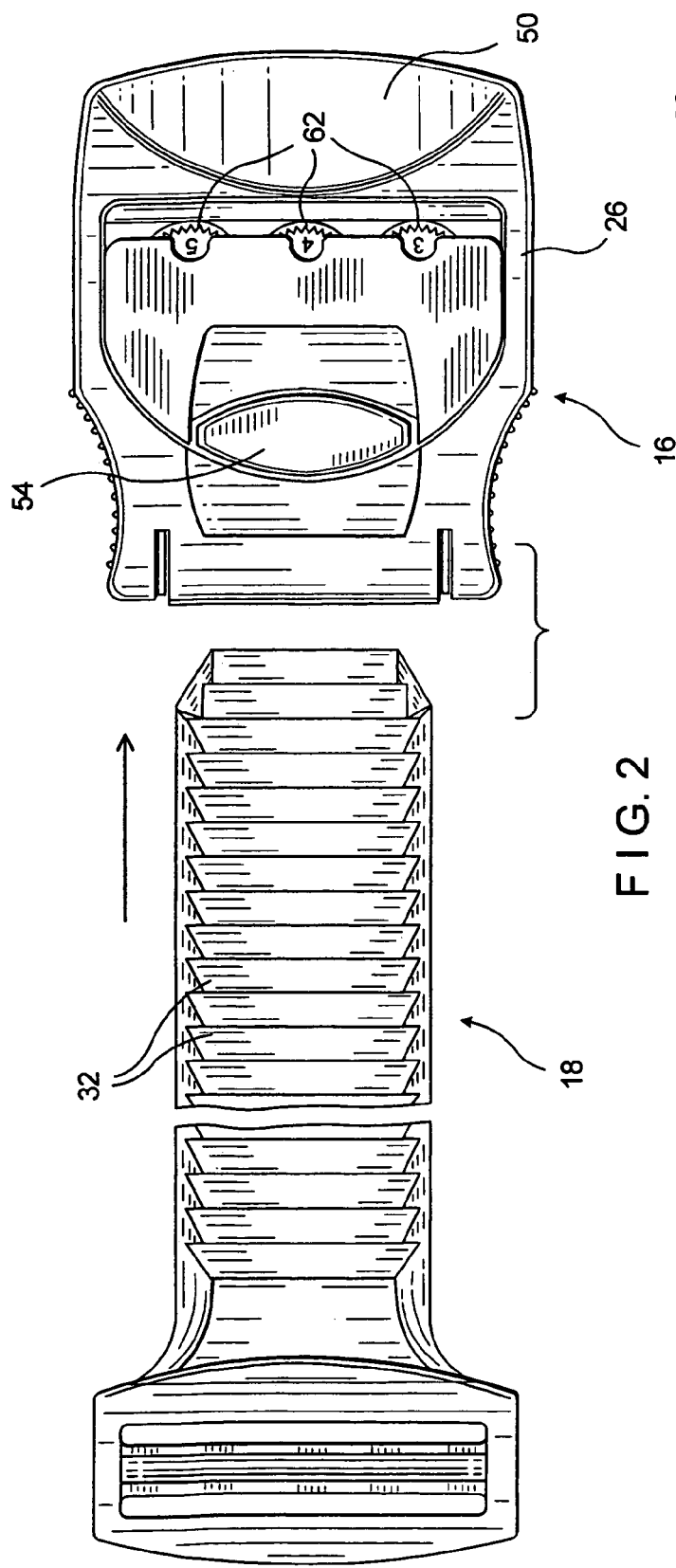
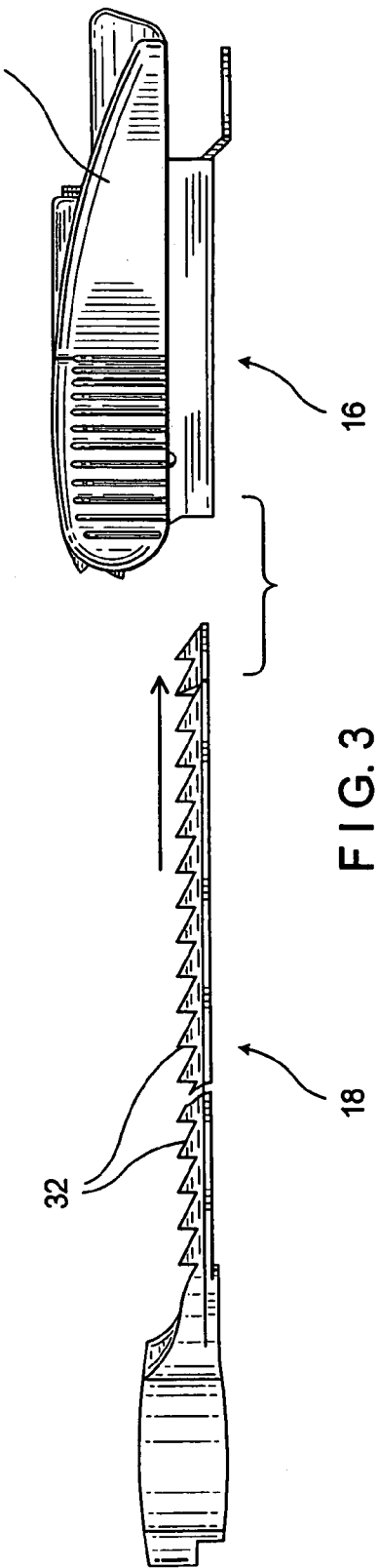
FIG. 2
FIG. 3

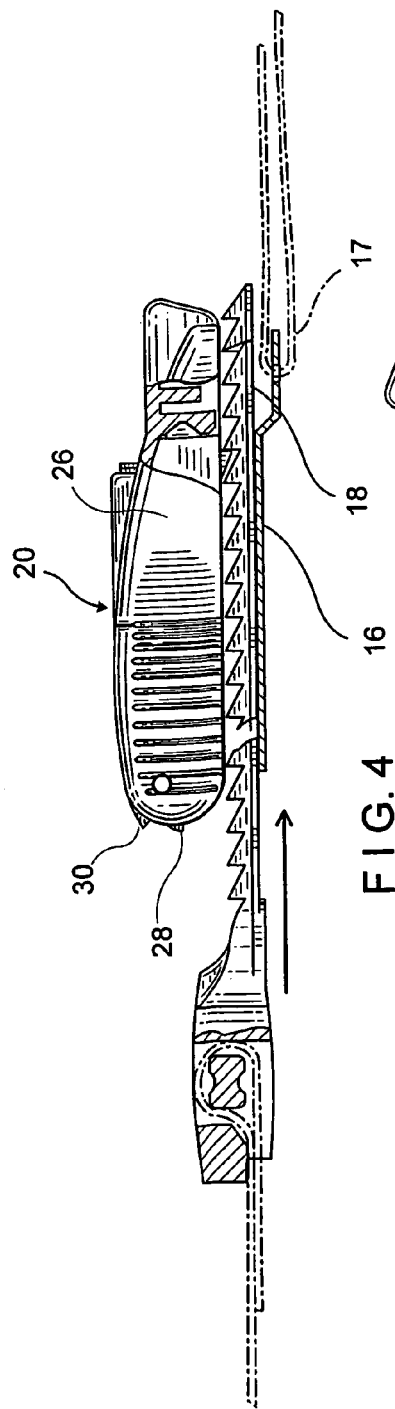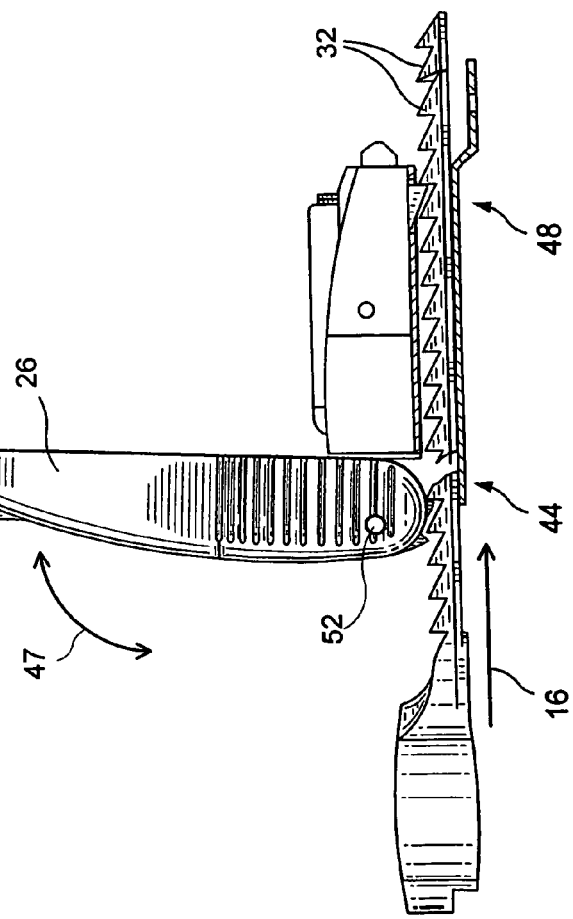
FIG. 4
FIG. 5

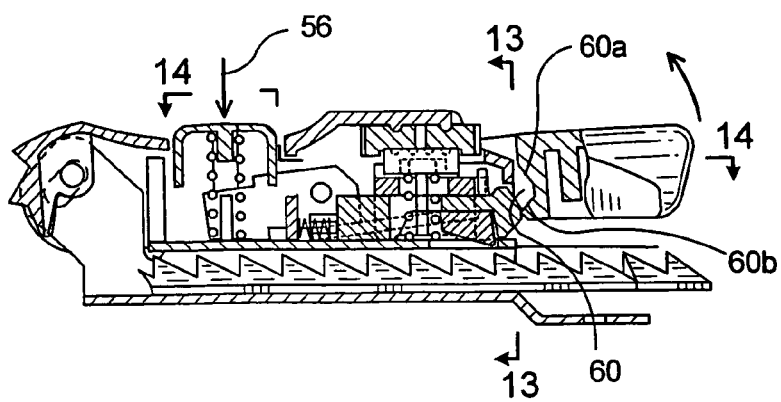
F I G. 12
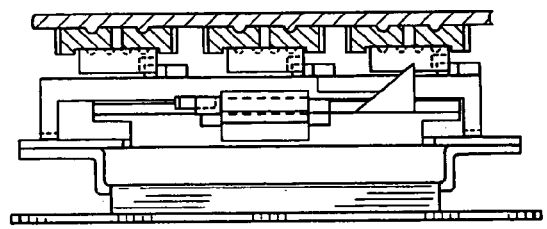
F I G. 13
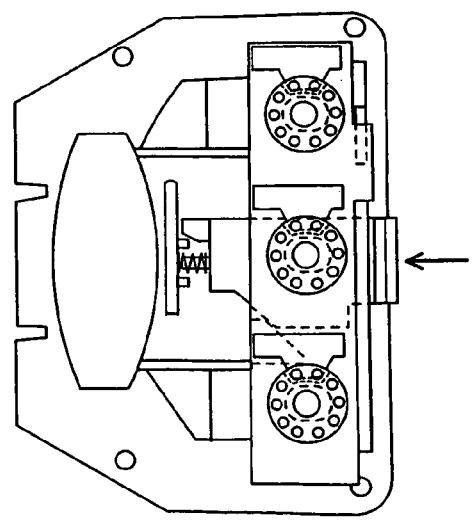
F I G. 14

LUGGAGE STRAP WITH RATCHET AND LOCK

CROSS REFERENCE TO RELATED APPLICATION

This application is a continuation of application Ser. No. 09/927,722, filed Aug. 10, 2001, to issue Feb. 3, 2004, as U.S. Pat. No. 6,684,667 and claims the priority of said application, the contents of which are herein incorporated by reference.

BACKGROUND OF THE INVENTION

1. Field of the Invention

This invention relates generally to joining first and second separable portions of the same item or of different items in overlapping relation. In its preferred embodiment, it relates to a novel and highly effective strap for wrapping around and snugly securing various articles such as luggage and protecting them against appropriation by unauthorized persons.

2. Description of the Prior Art

Straps, ropes, lines, etc. (herein collectively referred to as straps), for securing various articles are well known and very useful. For example, travelers use straps to reinforce luggage, to tie two or more pieces of luggage (or their handles) together so that they do not become separated, or as means for suspending luggage, cameras, or other items from a shoulder or a hand. Students wrap straps around books or other articles to facilitate carrying them or simply to keep them together. Vacationing families use straps anchored to a roof rack for securing articles on the roof of a station wagon. Shippers and warehousers use straps to secure goods on a pallet so that they can be handled by a forklift without falling off the pallet.

In all of these examples, the ends of the straps are conventionally secured to each other or to another anchoring structure by buckles or knots fastened or tied by hand, or by crimps or the like imposed by special, and expensive, strapping machinery. Unless strapping machinery is used, conventional straps are hard to tighten sufficiently to prevent articles from slipping out. After manually tightening straps to tie down a load atop a station wagon, for example, one often finds that the straps still have considerable slack in them. Moreover, anyone, whether authorized or not, can usually manually undo straps that have been manually secured. Failure to tighten a strap enough may permit articles to slip out so that they become damaged or lost. The ease with which conventional straps can be undone leaves the articles they secure vulnerable to theft.

OBJECTS AND SUMMARY OF THE INVENTION

An object of the invention is to remedy the problems of conventional straps noted above. In particular, objects of the invention include providing a mechanism for taking up slack in a deployed strap and providing a strap that can be securely tightened around one or more articles and that cannot be loosened by unauthorized persons.

The foregoing and other objects of the invention are attained by apparatus comprising first and second separable portions to be joined in overlapping relation, a ratchet operable with the portions joined in overlapping relation for increasing the amount of overlap, thereby effectively shortening the strap and taking up slack, and a lock that can be locked to prevent, or unlocked to enable, separation of the portions. In a preferred embodiment of the invention, the separable portions are opposite ends of the same strap for wrapping around at least one article, but the invention can also be used to join a strap to one or more separate anchoring structures or to join two straps together.

BRIEF DESCRIPTION OF THE FIGURES OF THE DRAWING

A better understanding of objects, features and advantages of the invention can be gained from a consideration of the following detailed description of the preferred embodiments thereof, in conjunction with the appended figures of the drawing, wherein:

FIG. 2 is a top view thereof;

FIG. 3 is a view in side elevation showing the apparatus in a first configuration;

FIGS. 4 and 5 are views corresponding to FIG. 3 and showing the apparatus in other configurations;

FIG. 12 is a view corresponding to FIG. 6 showing the operation of a detent of the apparatus for selectively holding or releasing a ratchet lever of the apparatus in or from a stored position; and FIGS. 13 and 14 are views, partly in section and with parts removed for clarity, taken generally along the lines 13—13 and 14—14, respectively, of FIG. 12.

DESCRIPTION OF THE PREFERRED EMBODIMENTS

Figure 1:
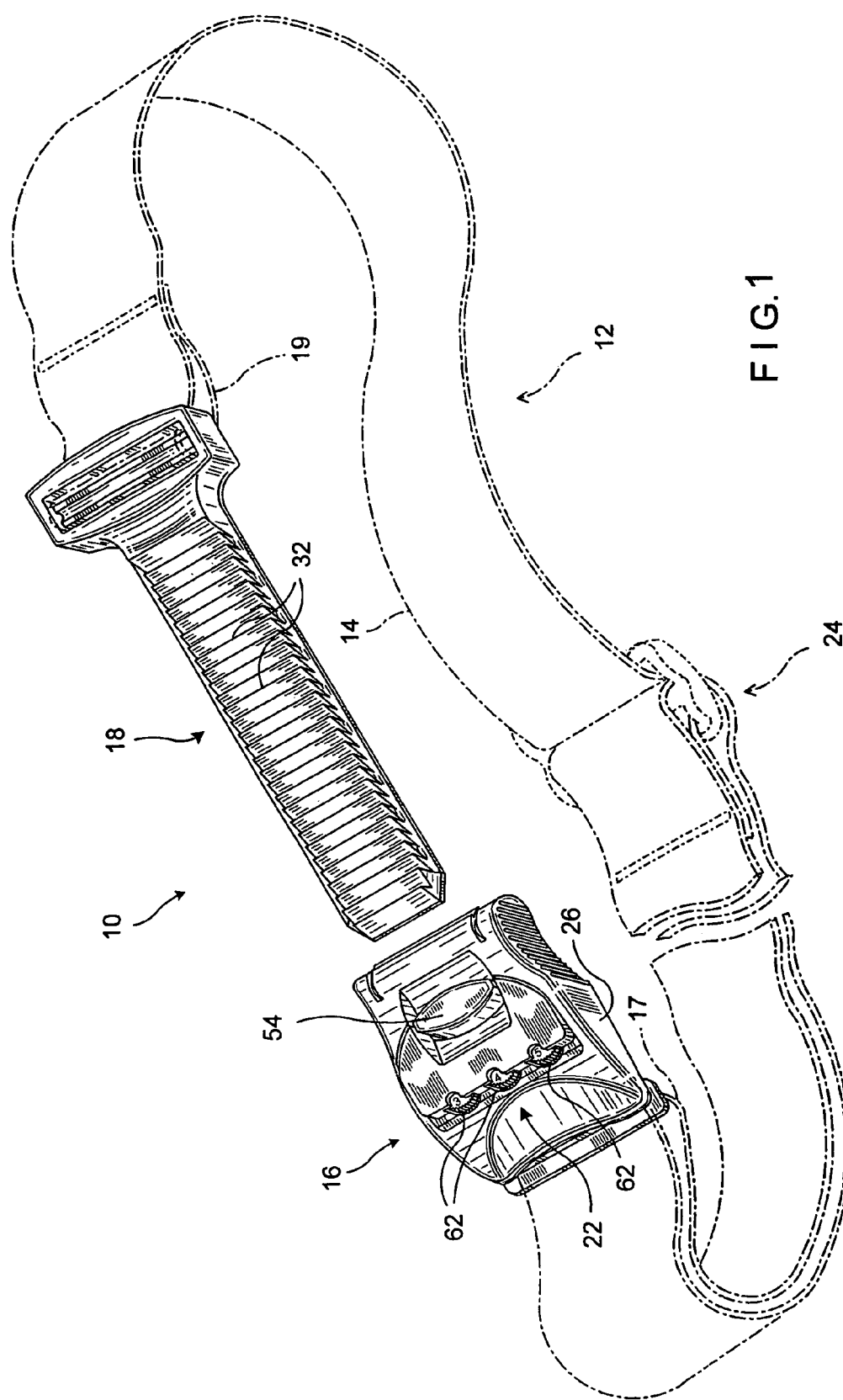
FIG. 1 is a perspective view of a preferred embodiment of apparatus constructed in accordance with the invention.
Figure 6:
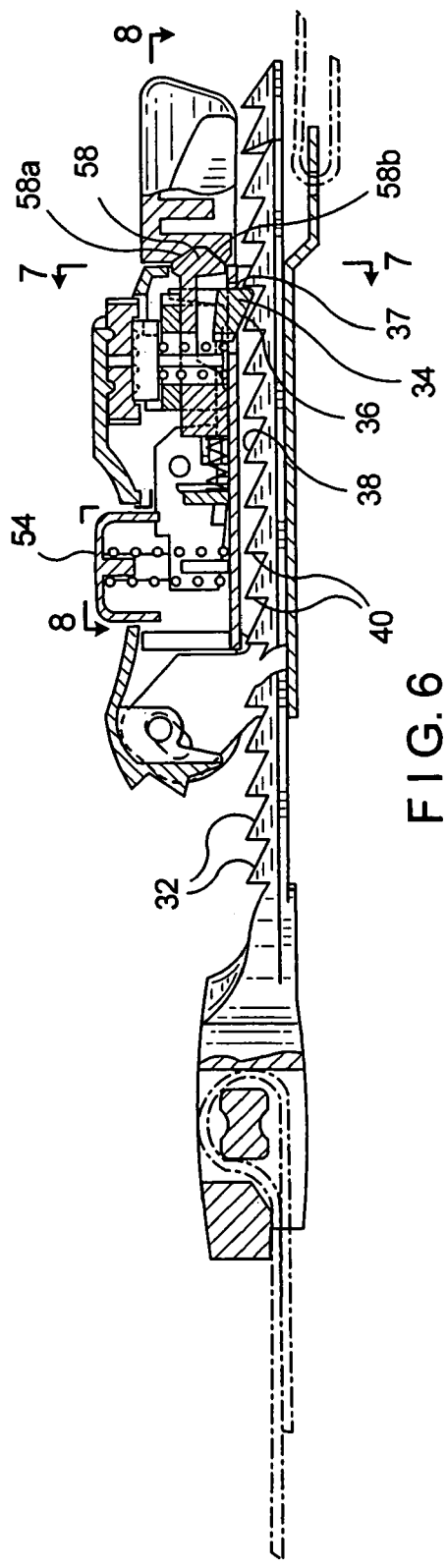
FIG. 6 is a partly sectioned view corresponding to FIG. 4.
Figure 8:
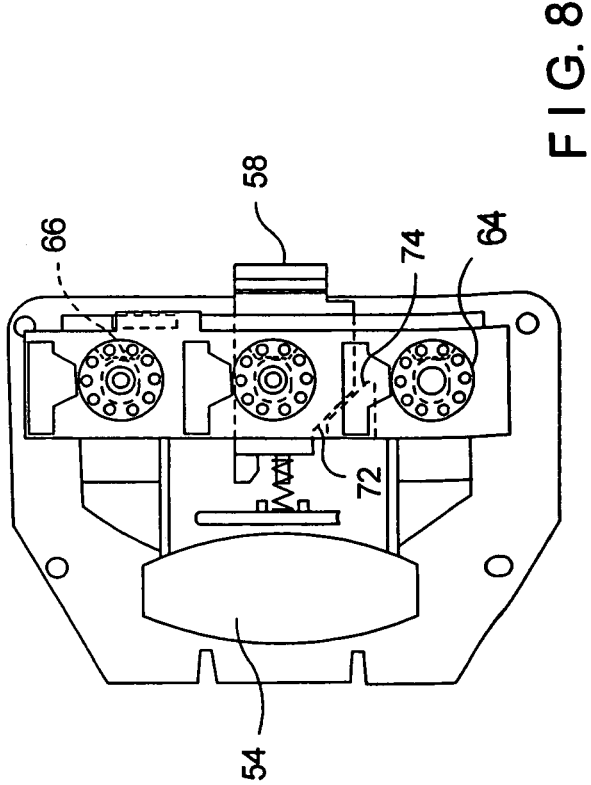
FIGS. 7 and 8 are views, partly in section and with parts removed for clarity, taken generally along the lines 7—7 and 8—8, respectively, of FIG. 6.
Figure 7:
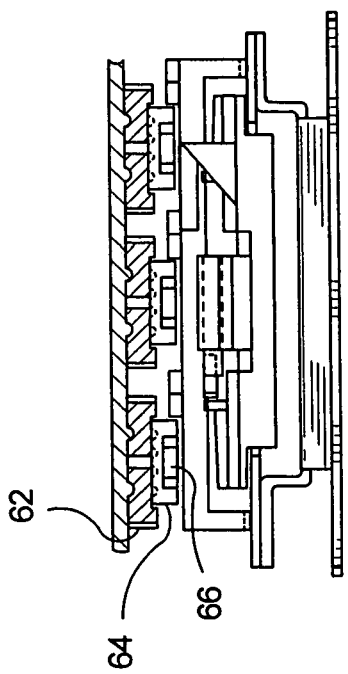

FIG. 1 shows a preferred embodiment of apparatus 10 constructed in accordance with the invention. It comprises a strap 12 for wrapping around at least one article (not shown). The article or articles can be, for example, luggage with hard or soft sides, luggage handles, books, shipping cartons, pieces of furniture, articles of clothing, etc. The articles may be of the same or different design.

The strap comprises a flexible part 14 that in a typical application may be made of a material such as a polyamide having great tensile strength. It has first and second separable end portions 16, 18 that are preferably made of metal (especially the portion 16), a rigid plastic (especially the portion 18), or a combination thereof (the portion 16). The flexible part 14 of the strap 12 is connected to the rigid end portion 16 by an adjustable loop 17 and to the rigid end portion 18 by a fixed loop 19. The apparatus 10 also comprises a ratchet 20 operable with the first and second separable portions 16, 18 in overlapping relation for increasing the amount of overlap, thereby effectively shortening the strap and taking up any slack that may be in it after wrapping around one or more articles. This enables the strap to be tightened securely around, say, soft luggage to compress it or hard luggage to keep it from popping open.

With the strap deployed, as by wrapping around one or more articles to be secured, a lock 22 can be locked to prevent, or unlocked to enable, loosening the strap. Means 24 is provided for preadjusting the strap 12 so that it is slightly longer than necessary to wrap around one or more articles to be secured. The preadjusting means 24 can also be used to adjust the strap so that it can be used comfortably as either a hand strap or a shoulder strap for carrying luggage and other articles. Such adjusting means 24 is conventional in shoulder straps for computer-carrying cases, some luggage, etc., and need not be described in detail.

The ratchet 20 comprises a lever 26 pivotally connected to the strap 12 near the first end portion 16, one or more claws 28, 30 integral with the lever 26, and a row of inclined teeth 32 integral with the strap 12 near the second end portion 18.

A pawl 34 is spring-biased towards the inclined teeth. The pawl 34 has a surface 36 with an inclination substantially the same as the inclination of surfaces 38 of the inclined teeth 32. The other surfaces 40 of the inclined teeth are vertical, as is the surface 37 of the pawl. Thus a force applied to the portion 18 in the direction of the arrow 42 (FIG. 4) forces the pawl 34 upward, overcoming its spring bias and enabling the portion 18 to move to the right. On the other hand, the vertical surface 37 of the pawl 34 and the vertical surfaces 40 of the teeth 32 lock up if an attempt is made to withdraw the portion 18 to the left.

In accordance with the invention, the ratchet 20 comprises the lever 26 pivotally connected to the first portion 16, the claws 28, 30 integral with the lever 26, the inclined teeth 32 integral with the second portion 18, and the pawl 34 connected to the first portion 16. The apparatus is constructed so that, when the first and second portions 16, 18 are joined in overlapping relation, the lever 26 can be pivoted counterclockwise (FIG. 5) to bring the claws 28, 30 into contact with respective teeth of a first set 44 of the teeth 32 to increase the amount of the overlap, by forcing the second portion 18 to the right relative to the first portion 16, as indicated by the arrow 46 (FIG. 5), thereby effectively shortening the strap and taking up slack. First the claw 28 engages a tooth 32, and if the lever 26 is pivoted farther in a counterclockwise direction, the claw 30 engages a succeeding tooth and propels the portion 18 still farther to the right relative to the portion 16. Three or more claws (only two being shown) can easily be provided. The ratcheting effected by operation of the lever 26 as described above may be repeated as many times as may be necessary to achieve the desired amount of tightening. When, as illustrated in the figures of the drawing, the apparatus employs a plurality of claws each integral with the lever, the lever can be pivoted to bring the claws sequentially and respectively into contact with successive teeth of the first set of teeth to increase the amount of overlap, and the pawl can sequentially engage successive teeth of the second set of teeth to maintain the increased amount of overlap. With each incremental movement of the portions 16, 18 relative to each other over a distance equal to the pitch of the teeth 32, the pawl 34 can engage a different tooth of a second set of teeth 48.

The first and second sets of teeth 44, 48 can have any relative relationship to each other along the row of teeth 32. If they are not widely separated in the longitudinal direction, they are likely to have at least one tooth in common, and perhaps several. In fact, the apparatus can be constructed so that the very tooth engaged and advanced by a claw is the tooth then held by the pawl. In such a case, the two sets of teeth 44, 48 may be identical. On the other hand, if the claw or claws and the pawl are well spaced apart longitudinally along the row of teeth 22, the first and second sets of teeth 44, 48 may have no teeth in common.

The lever 26 has a hand-grasp portion 50 and is pivoted about an axis 52 that is closer to the claw or claws 28, 30 than to the hand-grasp portion 50, thereby conferring a mechanical advantage when the hand-grasp portion 50 is employed to pivot the lever 26. This feature of the invention makes it possible to tighten the strap around the article much more securely than it can be tightened using conventional manual methods. A straight pull on a strap confers no mechanical advantage. A ten-pound manual pull on a strap, for example, sets up a tension of ten pounds in the strap. On the other hand, if the hand-grasp portion 50 is, say, five times as far from the pivot axis 52 as is the claw 28 or 30, than a ten-pound manual pull on the hand-grasp portion 50 translates to a fifty-pound tension in the strap, a mechanical advantage of five.

The ratchet further comprises a release mechanism making it possible to release the strap. The release mechanism comprises a release button 54 spring-biased upward (FIGS. 9 and 12) and operable only when the lock 22 is unlocked to withdraw the pawl 34 from the teeth 32. The release button 54 is connected in any suitable way, either integrally or through a suitable articulation, to the pawl 34 so that, when the release button is moved down as indicated by an arrow 56, the pawl 34 is moved up and retracted from the teeth 32, allowing separation of the portions 16, 18.

However, the lock 22 prevents actuation of the release button 54 when the lock is in its locked condition. Any conventional lock can be employed, but a combination lock, as indicated in the figures of the drawing, is preferred.

The apparatus further comprises a detent 58 for retaining the lever 26 in a stowed position illustrated for example in FIG. 4. The detent 58 has beveled surfaces 58a, 58b and fits within a recess 60 having correspondingly beveled surfaces 60a, 60b (FIG. 12). The detent 58 is spring-biased to the right as seen in those figures.

Figure 9:
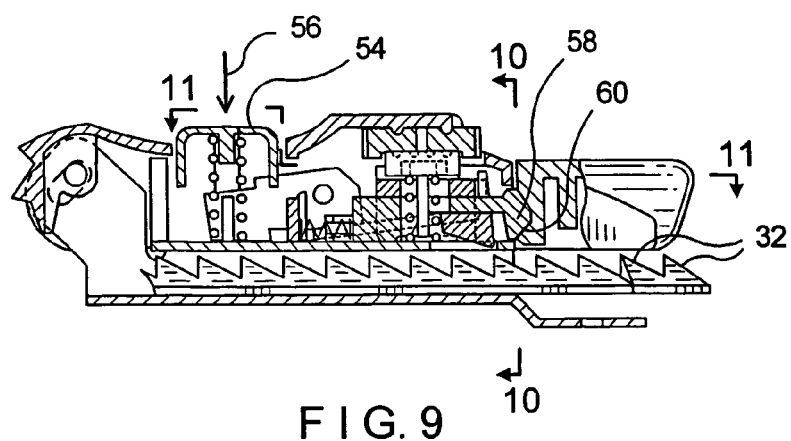
FIG. 9 is a fragmentary view corresponding to FIG. 6 showing the operation of a pawl-release mechanism of the apparatus.
Figure 10:
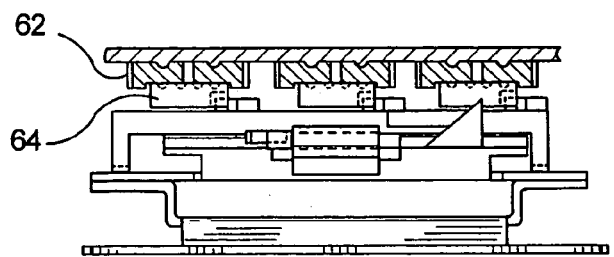
FIGS. 10 and 11 are views, partly in section and with parts removed for clarity, taken generally along the lines 10—10 and 11—11, respectively, of FIG. 9.

When the lever 26 is in its stowed position, shown for example in FIG. 9, and the lock is locked, the detent cannot be retracted and the lever cannot be withdrawn from the stowed position. When the lock is unlocked, the lever 26 can be freely pivoted counterclockwise about the pivot 52, since the surface 60b. in sliding over the surface 58b. can then force the detent 58 to the left (FIG. 12).

Figure 11:
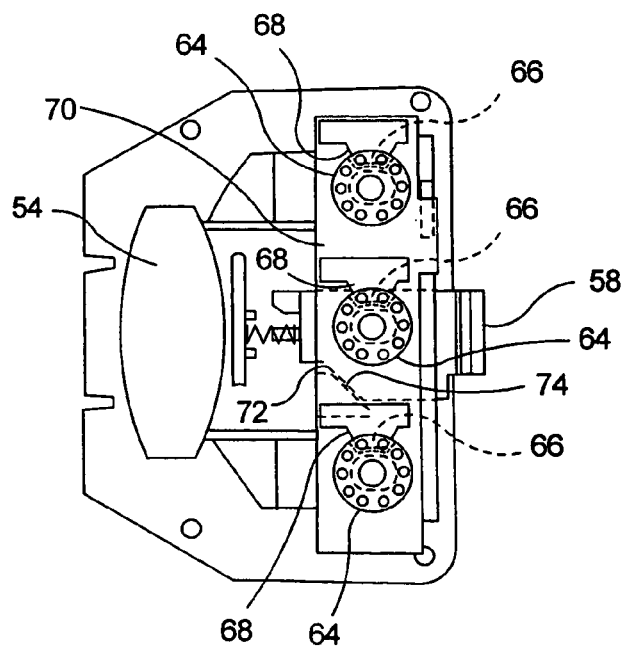

The lock 32 preferably comprises combination dials 62 (FIG. 1). The combination dials are connected to cogwheels 64 having respective recesses 66. The cogwheels 64 are initially turned relative to the dials 62 to set in any desired combination. The lock cannot be operated unless the dials are turned so that the recesses 66 are aligned with tabs 68 on a lock plate 70. In that configuration, the detent 58 can be forced to the left (FIG. 11) so that an inclined surface 72 integral with the detent 58 reacts on an inclined surface 74 integral with the lock plate 70 to force the lock plate downward (from the perspective of FIG. 11). This frees up both the lever 26 and the release button 54 for operation so that the lever 26 can be used to tighten the strap, or the release button 54 can be pressed to undo the strap.

Thus there is provided in accordance with the invention a novel and highly effective apparatus for joining first and second separable portions of the same article or of different articles in overlapping relation. In particular, there is provided a novel and highly effective strap for wrapping around and snugly securing various articles such as luggage and protecting them against appropriation by unauthorized persons.

Many other embodiments of the invention as disclosed herein will readily occur to those skilled in the art upon the consideration of this disclosure. In particular, only one of the portions 16, 18 need be on the strap 12. The other portion can be on an external anchoring structure. For example, in one embodiment (not shown), the strap is not wrapped around an article, but stretched horizontally between two supports in a substantially straight line (technically a catenary curve), for use as a clothesline, which can easily be tightened using the ratchet. In such case the strap is preferably round in cross section, but with at least one end constructed in accordance with this invention. The end so constructed is overlapped with structure, also constructed in accordance with the invention, on a separate portion of the strap or on one of the supports. In a similar embodiment, the strap can be used to secure one end of a hammock to a tree or other support or to secure articles to a roof rack atop a station wagon. In such case, one of the separable overlapping structures is attached to the strap and the other is attached to a separable portion of the strap or to the hammock, the tree, or the roof rack. Clearly, the strap need not be physically in one piece. If it is separable into, say, two pieces, an end of each piece can be secured in any conventional manner, and the apparatus of the invention can be used to join the other respective ends of the two pieces. Alternatively, respective first ends of the two pieces can be joined in any conventional manner, the second end of one of the two pieces can be connected to an external support structure in any conventional manner, and the second end of the other piece can be connected to the same or a different external support structure in accordance with the present invention. Also, the invention can be replicated to join any number of pieces end-to-end, although it need be employed only once in a chain in order to take up slack.

The scope of the invention is therefore commensurate with the appended claims.

I claim:

1. Apparatus comprising:

first and second separable portions to be joined in overlapping relation, wherein the separable portions are opposite ends of a strap for wrapping around at least one article; and a ratchet operable with the portions joined in overlapping relation for increasing the amount of overlap; and a combination lock that can be locked to prevent, or unlocked to enable, separation of the portions;

wherein the ratchet comprises a lever pivotally connected to the first portion and having a hand-grasp portion, a claw integral with the lever, a plurality of teeth integral with the second portion, and a pawl connected to the first portion, the hand-grasp portion being pivotal about an axis that is closer to the claw than to the hand-grasp portion, and the apparatus being constructed so that, when the first and second portions are joined in overlapping relation, the lever can be pivoted to bring the claw into contact with a tooth of a first set of said teeth to increase the mount of overlap, and the pawl can engage a tooth of a second set of said teeth to maintain the increased amount of overlap.

2. Apparatus according to claim 1 wherein the hand-grasp portion is substantially five times farther from the axis than is the claw.

* * * * *